(12) United States Patent
Fujimori

(10) Patent No.: US 10,362,472 B2
(45) Date of Patent: *Jul. 23, 2019

(54) COMMUNICATION APPARATUS, CONTROL METHOD THEREOF, AND STORAGE MEDIUM

(71) Applicant: CANON KABUSHIKI KAISHA, Tokyo (JP)

(72) Inventor: Yuki Fujimori, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/135,471

(22) Filed: Sep. 19, 2018

(65) Prior Publication Data

US 2019/0020994 A1    Jan. 17, 2019

Related U.S. Application Data

(63) Continuation of application No. 15/651,246, filed on Jul. 17, 2017, now Pat. No. 10,111,028.

(30) Foreign Application Priority Data

Jul. 19, 2016  (JP) ................................. 2016-141824

(51) Int. Cl.
*H04B 7/00*      (2006.01)
*H04B 1/38*      (2015.01)
(Continued)

(52) U.S. Cl.
CPC .............. *H04W 8/005* (2013.01); *H04W 4/80* (2018.02); *H04W 52/02* (2013.01);
(Continued)

(58) Field of Classification Search
CPC ....... H04W 4/008; H04W 4/08; H04W 8/005; H04W 24/00; H04W 52/02; H04W 84/12; H04W 84/20; H04W 88/18
(Continued)

(56) References Cited

U.S. PATENT DOCUMENTS 9,204,244 B2 * 12/2015 Rantala ............ H04W 56/0015
2007/0147242 A1 * 6/2007 Marilly ................... H04L 47/10
370/230

(Continued)

*Primary Examiner* — Quochien B Vuong
(74) *Attorney, Agent, or Firm* — Canon U.S.A., Inc. IP Division

(57) ABSTRACT

A communication apparatus includes a transmitting function and a receiving function for a radio signal, and, while belonging to a first group of devices, activates the transmitting and receiving functions to perform communication during a first period, and deactivates the transmitting and receiving functions outside the first period. The communication apparatus determines whether or not it performs monitoring for a presence of a second group of devices during a second period, controls performing of the monitoring by activating the receiving function during the second period when it is determined that the communication apparatus performs such monitoring, and keeping the transmission and receiving functions inactive outside the first period when it is determined that the communication apparatus does not perform such monitoring, and notifies another device in the first group of information related to the second group during the first period when a presence of the second group is detected.

13 Claims, 7 Drawing Sheets

(51) Int. Cl.
*H04W 8/00* (2009.01)
*H04W 56/00* (2009.01)
*H04W 52/02* (2009.01)
*H04W 4/80* (2018.01)
*H04W 84/20* (2009.01)
*H04W 84/12* (2009.01)

(52) U.S. Cl.
CPC ... *H04W 52/0229* (2013.01); *H04W 56/0015* (2013.01); *H04W 84/12* (2013.01); *H04W 84/20* (2013.01); *Y02D 70/00* (2018.01); *Y02D 70/142* (2018.01)

(58) Field of Classification Search
USPC .................................. 455/41.1, 41.2, 574
See application file for complete search history.

(56) References Cited

U.S. PATENT DOCUMENTS

2016/0223333 A1* 8/2016 Thakur ................. H04W 40/20
2018/0035356 A1* 2/2018 Gupta ................. H04W 40/244

* cited by examiner

COMMUNICATION APPARATUS, CONTROL METHOD THEREOF, AND STORAGE MEDIUM

CROSS-REFERENCE TO RELATED APPLICATION

This application is a Continuation of U.S. application Ser. No. 15/651,246, filed Jul. 17, 2017, which claims the benefit of Japanese Patent Application No. 2016-141824, filed Jul. 19, 2016. These documents are hereby incorporated by reference herein in their entirety.

BACKGROUND

Field

The present disclosure relates to a communication apparatus, a control method of the communication apparatus, and a storage medium.

Description of the Related Art

Recently, wireless local area networks (LANs) implemented by using the IEEE 802.11 set of standards have been widely used and, accordingly, various network form products and specification standards for wireless LAN have been developed. US Patent Application Publication No. 2014/0302787 describes a neighbor awareness network (NAN) standard defined by Wi-Fi® Alliance as a standard for a communication apparatus to detect, with a low power consumption, another communication apparatus or a service provided by the other communication apparatus. Using this technique, a communication apparatus can synchronize with another communication apparatus the periods of time when it will transmit and receive information to and from the other communication apparatus. Such synchronization allows the communication apparatus to shorten the periods of time that a radio frequency unit needs to be kept active, and thus can improve the power saving performance of the communication apparatus. In the below discussion, a communication apparatus that operates according to the NAN standard is referred to as a NAN device. Further, the synchronized periods of time when a communication apparatus in a NAN will transmit and receive information from another communication apparatus, is referred to as a discovery window (DW). The DW period is repeated periodically at regularly occurring intervals, for example. Further, a group of NAN devices which share a same DW period is referred to as a NAN cluster.

A NAN device belonging to a NAN cluster operates in one of the following roles: a master, a non-master sync, and a non-master non-sync. A NAN device that operates as a master periodically transmits a synchronization beacon (hereinafter, referred to as a sync beacon) which is a beacon used by other terminals to recognize the master NAN device's DW and synchronize with the master's DW time period. Further, a NAN device that operates as a master transmits, to a terminal that does not belong to the NAN cluster, a discovery beacon. A discovery beacon is a signal to assist devices which are not part of a NAN cluster to recognize or detect the NAN cluster. As one example, the discovery beacon might be transmitted every 100 ms for example during time periods that are not a DW period. In each NAN cluster, at least one of the NAN devices operates as a master. A NAN device that operates as a non-master sync transmits a sync beacon but does not transmit a discovery beacon. A NAN device that operates as a non-master non-sync does not transmit a sync beacon nor a discovery beacon.

A NAN device that joins a NAN cluster can share information at least during any one of the DW periods, regarding the presence of another NAN device and/or a service or application provided to or from the other NAN device. For example, NAN devices transmit and receive a subscribe message, which is a signal searching for a service, and a publish message, which is a signal notifying that a certain service is being provided, to and from each other. Further, during a DW period, the NAN device can transmit and receive a follow-up message to exchange additional information related to a service. Frame configurations of messages such as a publish message, a subscribe message, and a follow-up message, are defined in the NAN standard and are referred to as service discovery frames (SDFs). A SDF includes a service ID, which is an identifier for identifying a target service. NAN devices transmit and receive SDFs to and from each other to find or detect services.

When a NAN device detects a presence of a NAN cluster different from the NAN cluster to which the NAN device belongs, the two different NAN clusters can be integrated by merging them. For example, when a NAN device receives a discovery beacon transmitted from another NAN cluster, the NAN device can compare cluster grades between the first NAN cluster to which the NAN device currently belongs and the newly found second NAN cluster. A cluster grade is a property value set for each cluster. When the cluster grade of the second NAN cluster is higher than the cluster grade of the first NAN cluster, the NAN device may join the second NAN cluster. When the NAN device's role is that of a master or a non-master sync, the NAN device that has joined the second NAN cluster transmits, to the first NAN cluster, a sync beacon including information about the second NAN cluster which the NAN device has newly joined. Then, the NAN devices in the first NAN cluster receive the sync beacon and join the second NAN cluster, and in this way the first NAN cluster is merged with the second NAN cluster. By integrating the NAN clusters in this manner, a NAN device can search for services from a larger number of NAN devices.

It is assumed that a NAN device is not required to receive data transmitted from another device outside of the DW periods. However, a discovery beacon from another NAN cluster may not always be transmitted during the DW periods of the NAN cluster to which a NAN device belongs. Thus, in order to detect the presence of another NAN cluster and merge two NAN clusters, it may be necessary for each NAN device to keep a radio frequency unit active outside of its DW periods, in order to be able to receive a discovery beacon outside of its DW periods. However, when a NAN device always keeps its radio frequency unit active even outside of its DW periods, the reduction in consumed power achieved by implementing a NAN may be canceled or significantly reduced.

SUMMARY

Various embodiments of the present disclosure perform communication such that a communication apparatus in one group of communication apparatuses can detect, with a lower power consumption, another group of communication apparatuses.

In some embodiments, a communication apparatus includes a communication unit having a transmitting function and a receiving function for a radio signal. While belonging to a first group of devices, the communication apparatus activates the transmitting function and the receiving function during a first period to perform communication, and deactivates the transmitting function and the receiving function outside the first period. The communication apparatus also includes a determination unit configured to determine whether or not the communication apparatus, among devices in the first group, performs monitoring for a presence of a second group of devices which is different from the first group during a second period which is different from the first period, a control unit configured to control the communication unit by activating the receiving function and performing the monitoring during the second period when it is determined that the communication apparatus performs such monitoring, and by keeping the transmitting function and the receiving function inactive outside the first period when it is determined that the communication apparatus does not perform such monitoring, and a notification unit configured to notify another device in the first group of information related to the second group during the first period when a presence of the second group is detected during the second period.

Further features will become apparent from the following description of exemplary embodiments (with reference to the attached drawings).

DESCRIPTION OF THE EMBODIMENTS

Embodiments of the present disclosure will be described in detail below with reference to the drawings. It is noted that the following embodiments are simply given as exemplary embodiments and are not to be interpreted as limiting the content of the present disclosure. For example, an example embodiment is described below in which a wireless LAN system compatible with the neighbor awareness network (NAN) standard is described but the present disclosure is not limited to this configuration. In other words, for example, the following discussion can be applied to any system in which there are a plurality of communication groups that become communicable at predetermined time periods, which occur at regular time intervals, where two communication groups can be integrated to become one communication group based on a signal transmitted from a communication apparatus in one of the groups to the other group.

In the below description, the standard that the communication apparatus follows is referred to as the NAN standard, and a network, which is formed according to the NAN standard and used to search and find services, is referred to as a NAN. Further, as described above, a communication apparatus, which operates according to the NAN standard, is referred to as a NAN device, and a group of NAN devices which operate in a same discovery window (DW) period is referred to as a NAN cluster.

(Configuration of Wireless Communication System)

Figure 1:
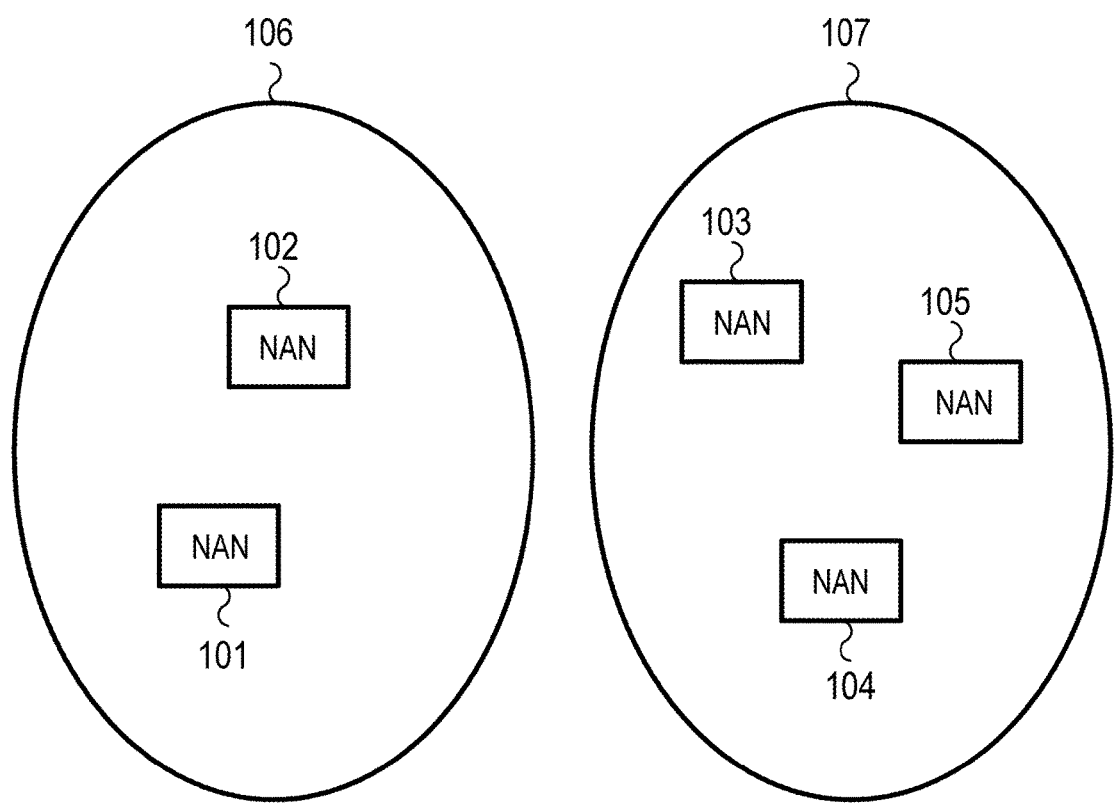
FIG. 1 is a diagram illustrating a configuration example of a wireless communication system according to one embodiment.

FIG. 1 illustrates an example of a configuration of a wireless communication system according to one embodiment. The wireless communication system includes wireless communication apparatuses (NAN devices 101 to 105) that can operate according to the NAN standard. The wireless communication system may include other communication apparatuses, for example, such as an access point and a terminal (which are not illustrated). Further, the NAN devices 101 to 105 may be any devices as long as the devices are communication apparatuses that can join the NAN and perform communications related to an application.

The NAN devices 101 to 105 find a communication apparatus in a surrounding area and a service provided by the communication apparatus according to the NAN standard, or allow a NAN device in the surrounding area to find a service provided by the NAN devices 101 to 105. In the NAN, a group of NAN devices that share a same cycle of turning on an RF function is defined as a NAN cluster and the NAN devices are referring to as belonging to the NAN cluster. FIG. 1 illustrates that the NAN devices 101 and 102 belong to a NAN cluster 106 and the NAN devices 103 to 105 belong to a NAN cluster 107.

According to the present embodiment, the NAN devices 101 to 105 of the NAN clusters 106 and 107 establish a network with a network of 6ch (2.437 GHz) with a frequency band of 2.4 GHz. The NAN clusters 106 and 107 are NAN clusters in which a length of a DW period is 16 TUs (Time Unit, 1 TU is 1024 microseconds) and a time interval from a start timing of a DW period to a start timing of a following DW period is 512 TUs. Note that the frequency channel and the DW period used in the NAN cluster are not limited to the above example, and any one of a different frequency channel and a DW period having a different period length or different intervals may be used.

To each of the NAN devices, a master rank, which is defined in the NAN standard, is set as a factor to decide a role in the NAN cluster. The master rank is determined based on a master preference, a random value, and an interface address, which are set for each NAN device. A NAN device is likely to be allocated with a role as a master when the NAN device has a higher master rank while a NAN device is likely to be allocated with a role as a non-master non-sync when the NAN device has a lower master rank. The NAN device that has a highest master rank in the NAN cluster is referred to as an anchor master and is allocated with a role to be a time reference in the NAN cluster. The NAN standard suggests that a higher master rank is applied to a NAN device that consistently stays in a NAN cluster, such as a NAN device driven by a power source and does not change its location for example. Further, it is suggested that a lower master rank is allocated to a NAN device that may not consistently stay in a NAN cluster, such as a device driven by a battery and a mobile terminal. When a NAN device that consistently stays in a NAN cluster serves as a master and transmits synchronization signals, the NAN cluster is kept stable.

Further, each NAN cluster is set with a cluster grade, which is defined in the NAN standard. A value of the cluster grade can be calculated as $CG=A1\times 2^{64}+A2$, where A1 is a master preference of an anchor master and A2 is a time synchronization function (TSF) value. The NAN standard defines that, when a NAN device finds a NAN cluster which is different from the NAN cluster to which the NAN device belongs, these NAN clusters are merged, to the NAN cluster with a higher cluster grade.

(Configuration of NAN Device)

Figure 2:
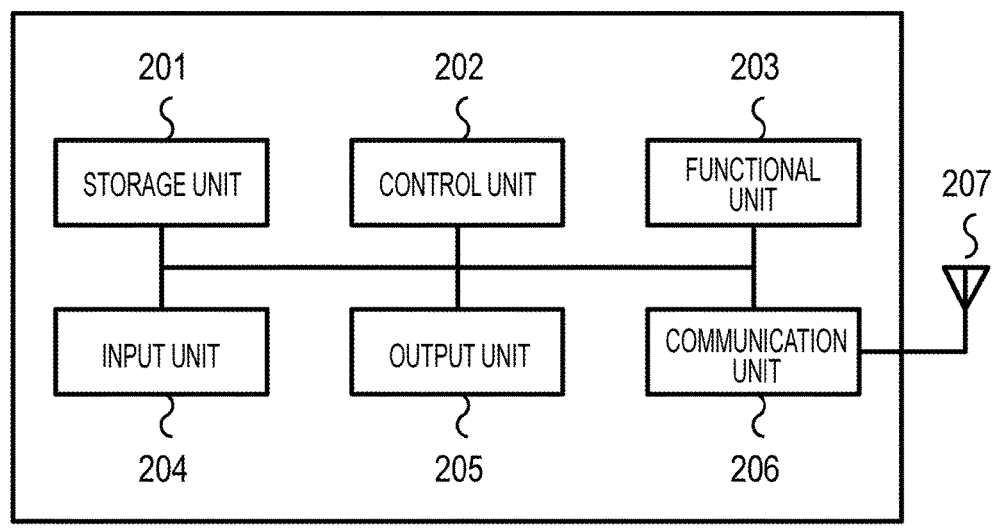
FIG. 2 is a block diagram illustrating a hardware configuration example of a NAN device according to one embodiment.

FIG. 2 illustrates a hardware configuration example of the NAN device 101. Here, only the NAN device 101 will be described in this example; however, the NAN devices 102 to 105 also have the same configuration. The NAN device 101 includes a storage unit 201, a control unit 202, a functional unit 203, an input unit 204, an output unit 205, a communication unit 206, and an antenna 207, for example, as its hardware configuration.

The storage unit 201 is configured with both of a ROM and a RAM or one of the ROM and RAM, and stores a later described program for performing various operations or various information such as a communication parameter used in wireless communication. Here, the ROM is an acronym standing for a read only memory and the RAM is an acronym standing for a random access memory. Here, as the storage unit 201, a storage medium such as a flexible disk, a hard disk, an optical disk, a magnetic optical disk, a CD-ROM, a CD-R, a magnetic tape, a non-volatile memory card, and a DVD may be used in addition to the memory including the ROM and RAM.

The control unit 202 is composed of a CPU or an MPU, and controls the NAN device 101 overall by executing a program stored in the storage unit 201. Here, the CPU is an acronym standing for a central processing unit, and the MPU is an acronym standing for a micro processing unit. Here, the control unit 202 may control the NAN device 101 overall in cooperation with the program stored in the storage unit 201 and an OS. Here, the OS is an acronym standing for an operating system. Further, the control unit 202 controls the functional unit 203 and executes a predetermined process such as imaging, printing, projecting, and the like.

The functional unit 203 is a hardware used by the NAN device 101 to execute a predetermined process. For example, in a case that the NAN device 101 is a camera, the functional unit 203 serves as an image pickup unit and performs an image pickup process. Further, for example, in a case that the NAN device 101 is a printer, the functional unit 203 serves as a printing unit and performs a printing process. Further, for example, in a case that the NAN device 101 is a projector, the functional unit 203 serves as a projecting unit and performs a projecting process. The data processed in the functional unit 203 may be the data stored in the storage unit 201 or the data acquired from another NAN device via a later described communication unit 206.

The input unit 204 accepts various operations by a user. The output unit 205 performs various outputs to the user. Here, the outputs from the output unit 205 include at least one of a display on a screen, a sound output from a speaker, a vibration output, and the like. Here, both of the input unit 204 and output unit 205 may be realized in a single module such as a touch panel.

The communication unit 206 controls wireless communication compatible with IEEE 802.11 series and controls IP communication. IP is an acronym standing for Internet Protocol. Further, the communication unit 206 controls the antenna 207 and transmits and receives radio signals for wireless communication. The NAN device 101 transmits and receives contents such as image data, text data, video data, and the like to and from another NAN device via the communication unit 206.

In one embodiment, the communication unit 206 has a signal transmitting function and a signal receiving function and can activate or deactivate those functions separately and independently according to an instruction from the control unit 202. It is assumed that the transmitting function and receiving function consume power while being active and do not consume power or consume less power when in the inactive state, as compared to the activate state.

Figure 3:
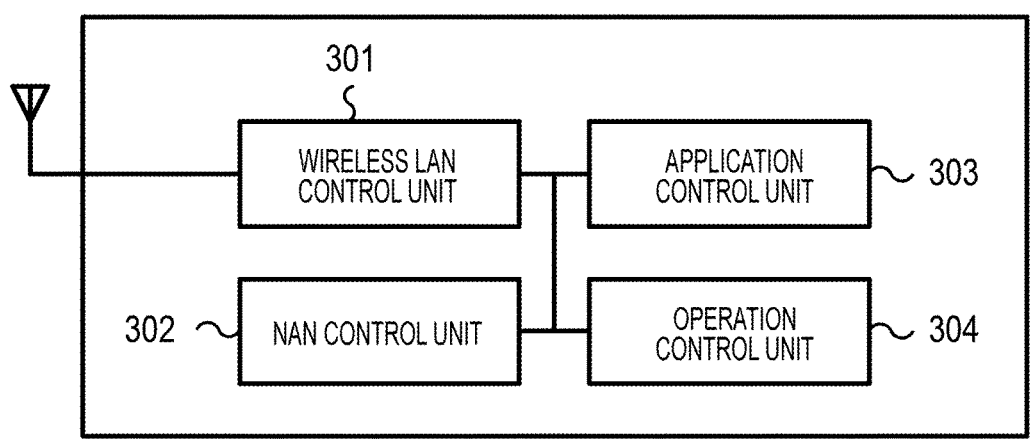
FIG. 3 is a block diagram illustrating a functional configuration example of the NAN device according to one embodiment.

FIG. 3 illustrates a functional configuration example of the NAN device 101. In this example, only the NAN device 101 will be described; however, the NAN devices 102 to 105 have the same configuration. The NAN device 101 includes a wireless LAN control unit 301, a NAN control unit 302, an application control unit 303, and an operation control unit 304 for example, as a functional configuration.

The wireless LAN control unit 301 performs control for transmitting and receiving a radio signal according to a signal format of a corresponding wireless LAN to and from another communication apparatus that can communicate via the wireless LAN. Further, the wireless LAN control unit 301 executes various controls related to the wireless LAN according to series of IEEE 802.11 standards. The NAN control unit 302 executes various controls of service searching and fining, and the like according to the NAN standard. Further, the NAN control unit 302 executes a NAN function start process and an operation mode determination process, which will be described in the following. The NAN control unit 302 controls the wireless LAN control unit 301 according to an operation mode determined in the operation mode determination process. The NAN control unit 302 has a function for reducing power consumption by the communication unit 206 of FIG. 2 and improving its power saving performance by controlling the wireless LAN control unit 301 to deactivate at least one of the transmitting function and receiving function for a preferable period of time.

The application control unit 303 causes the NAN control unit 302 to start or end the NAN function in response to the application process. Then, the NAN control unit 302 establishes a network with a device found by the NAN function and the wireless LAN control unit 301 transmits and receives application data under the control by the application control unit 303. For example, when a user (not illustrated) of the NAN device 101 starts an image sharing service application that uses NAN, the application control unit 303 instructs the NAN control unit 302 to perform a NAN function start process. After that, the NAN control unit 302 establishes a network with the found device according to the series of IEEE 802.11 standards by controlling the wireless LAN control unit 301 and, transmits and receives image data via the established network. On the other hand, when the user of the NAN device 101 ends the application, the application control unit 303 instructs the NAN control unit 302 to perform a NAN function end process. Note that the transmission of the application data may be performed according to another communication standard other than the NAN standard.

The operation control unit 304 accepts and manages an operation by the user of the NAN device 101 and, in response to the operation, transfers a proper signal at a proper timing to the wireless LAN control unit 301, NAN control unit 302, and application control unit 303 respectively.

(Process Flow)

Next, an example of a process flow executed by the above described NAN device 101 will be described. In the following discussion, a process executed by the NAN device 101 will be described; however, the NAN devices 102 to 105 can also execute the same process.

In the following embodiment, the NAN device 101 generates a NAN cluster or joins an existing NAN cluster, and activates its transmitting function and receiving function in a DW period which comes in a first cycle related to the NAN cluster 106 to which the NAN device 101 belongs. Then, the NAN device 101 determines whether or not the NAN device 101 among the devices in the NAN cluster 106 monitors a presence of another NAN cluster outside the DW period and, according to the determination, determines whether or not to activate its receiving function during a predetermined period of time outside the DW period. Here, the predetermined period of time is set to be a period longer than a maximum transmission period of a discovery beacon. When the NAN device 101 determines that the NAN device 101 monitors a presence of another NAN cluster outside the DW period, the NAN device 101 deactivates its transmitting function and receiving function except for the DW period for the NAN cluster to which the NAN device 101 belongs and the predetermined period of time. With this action, the NAN device 101 can suppress its power consumption since the transmitting function and receiving function are not kept active all the time. Then, when the NAN device 101 detects a presence of another NAN cluster outside the DW period, the NAN device 101 notifies another device, which belongs to the NAN cluster 106, that another NAN cluster has been found during the DW period of the NAN cluster 106. Further, when it is determined that another device in the NAN cluster 106 monitors a presence of another NAN cluster during the above predetermined period and the NAN device 101 does not perform the monitoring, the NAN device 101 deactivates the transmitting function and receiving function outside the DW period. In this case, the NAN device 101 can receive a notification of a result of the monitoring from the another device in the NAN cluster 106 during the DW period of the NAN cluster 106. In this manner, since the NAN device 101 deactivates its communication function outside the DW period when the NAN device 101 dose not monitor a presence of another NAN cluster, and limits the period to execute the monitoring when the NAN device 101 executes the monitoring, the power consumption can be reduced. The power consumption of the entire system can be significantly reduced when a larger number of NAN devices in the wireless communication system perform this process.

In the following, the above process will be described in detail.

First Embodiment

Figure 4:
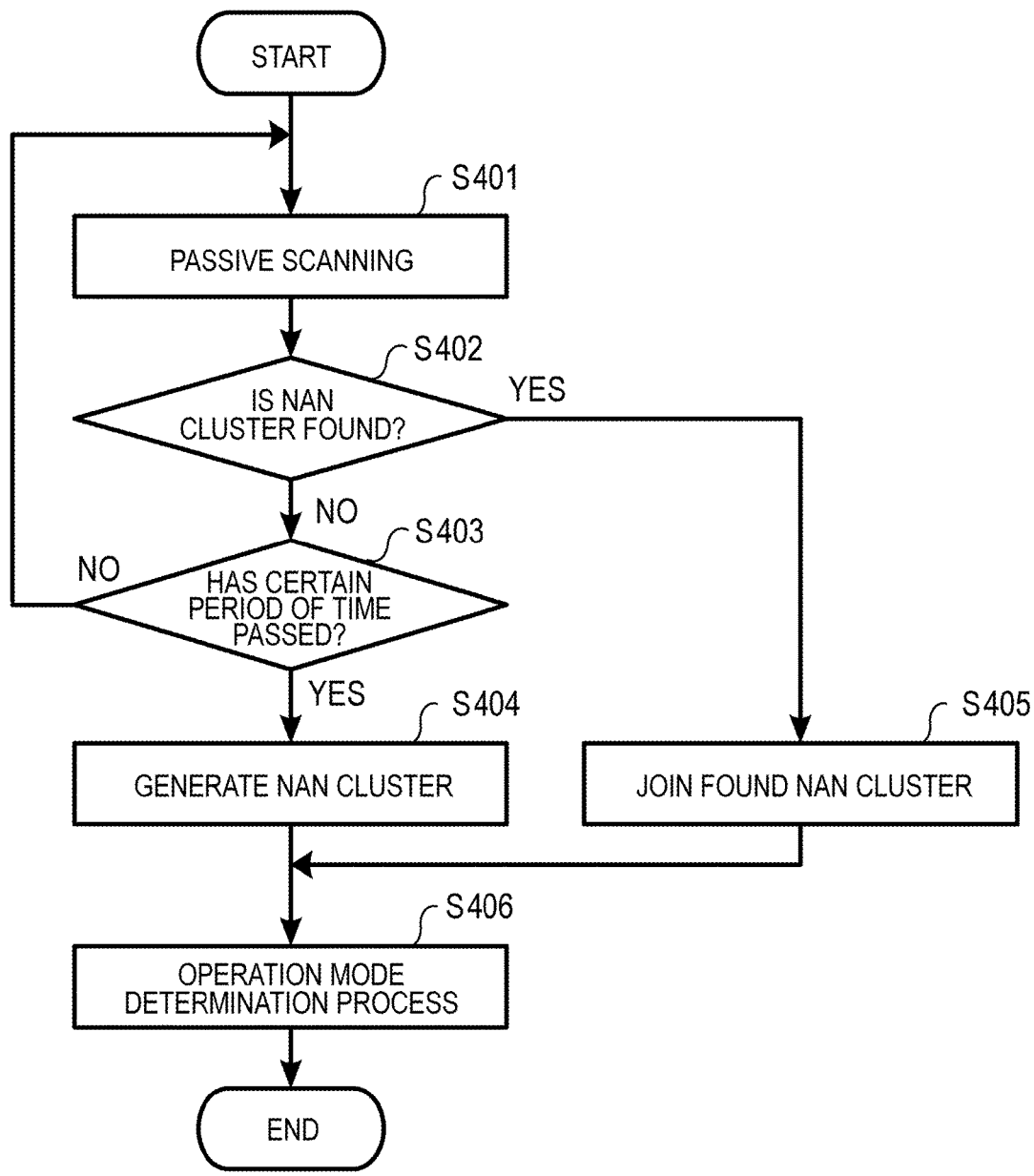
FIG. 4 is a flowchart illustrating an example of a NAN function start process flow according to one embodiment.

FIG. 4 illustrates an example of the NAN function start process flow, which is executed by the NAN control unit 302. The NAN function start process is a process executed when the NAN device 101 starts the NAN function. The NAN device 101 may start the NAN function when an image sharing service application using NAN is activated or when the power of the NAN device 101 is turned on, for example. Here, the flowchart illustrated in FIG. 4 can be realized when the control unit 202 of the NAN device 101 executes a control program stored in the storage unit 201 and controls calculating and processing of information and each hardware.

In this process, the NAN device 101 firstly executes passive scanning of a NAN cluster being in a surrounding area (S401). The NAN device 101 according to the present embodiment scans 6ch in the passive scanning. When a discovery beacon or a synchronization beacon (hereinafter, referred to as a sync beacon) is received, the NAN device 101 determines that a NAN cluster is found (YES in S402). On the other hand, when such a beacon is not received, the NAN device 101 determines that a NAN cluster has not found (NO in S402).

When a NAN cluster is not found (NO in S402), the NAN device 101 judges whether or not a certain period of time has passed since the passive scanning starts (S403), the process returns to S401 in a case that the certain period of time has not passed (NO in S403). On the other hand, when it is judged that the certain period of time has passed without finding a NAN cluster (YES in S403), the NAN device 101 ends the passive scanning and generates a NAN cluster (S404). When generating a NAN cluster, the NAN device 101 generates a new NAN cluster including the NAN device 101 itself and serves as an anchor master to execute a process specified in the NAN standard, such as transmission of a discovery beacon or a sync beacon and the like.

In this case, the above certain period of time is two minutes as an example; however, this example does not set any limitation and any length of time may be set as the certain period of time here. Also, in passive scanning, the receiving function of the communication unit 206 needs to be activated at least in a certain period of time and, when the period of activating the function becomes longer, the consumed power becomes greater. Therefore, also in the passive scanning, a period that the receiving function of the communication unit 206 is made active may be set as a certain period of time which is equal to or longer than 200 TUs, the maximum cycle of a discovery beacon, as executed in a later described merge management operation mode. With this configuration, since the NAN device 101 can find a NAN cluster in a short time when a discovery beacon is transmitted in a surrounding area, the receiving function does not have to be kept active unnecessarily for a long period of time.

When a NAN cluster is found in S402 (YES in S402), the NAN device 101 joins the found NAN cluster (S405). When joining the NAN cluster, the NAN device 101 synchronizes with the DW of the NAN cluster and executes a process defined in the NAN standard according to the information of the NAN cluster received during the passive scanning.

After the process in S404 or S405, the NAN device 101 executes the operation mode determination process (S406). The operation mode determination process will be described later.

As the operation mode, there are a merge management mode and a power saving mode. In the merge management mode, the receiving function of the communication unit 206 is activated for a certain period of time outside the DW period to monitor a presence of another NAN cluster. Since the receiving function of the communication unit 206 is activated outside the DW period, a possibility of receiving a discovery beacon or a sync beacon transmitted from another NAN cluster can be made higher. In one embodiment, the certain period of time in this example can be set equal to or loner than 200 TUs, for example. This is because, in the NAN standard, a discovery beacon is supposed to be transmitted every 200 TUs as long as the timing does not occur during the DW period. In this embodiment, when the timing of transmitting a discovery beacon occurs during the DW period, the transmission of a discovery beacon can be skipped and a sync beacon is required to be transmitted in the DW period. Thus, by setting the above certain period of time to be equal to or longer than 200 TUs, the NAN device 101 can receive a discovery beacon or a sync beacon and find another NAN cluster within the period. According to the present embodiment, the receiving function is activated once between the DW periods; however, the receiving function may be activated twice between two DW periods for example; these examples do not set any limitation.

In the merge management mode, as described above, when a NAN cluster, which is different from the NAN cluster to which the NAN device 101 currently belongs, is found, the NAN device 101 performs a merge process of the NAN cluster according to the NAN standard. In other words, the NAN device 101 compares cluster grade of the first NAN cluster to which it currently belongs and the cluster grade of the found second NAN cluster and, when the cluster grade of the second NAN cluster is higher, the NAN device 101 joins the second NAN cluster. After that, the NAN device 101 transmits a sync beacon during the DW period of the first NAN cluster to which the NAN device 101 has been belonged. To the sync beacon, a NAN IE (information element) is applied and a cluster ID of the second NAN cluster is stored in A3 address field in NAN IE. With this configuration, the NAN device 101 can notify another NAN device in the first NAN cluster of a presence of a second NAN cluster.

On the other hand, the NAN device 101 operates to suppress its power consumption by not activating (deactivating) the receiving function of the communication unit 206 outside the DW period, in the power saving mode. In the power saving mode, finding and merging of another NAN cluster is performed by receiving the sync beacon transmitted from another NAN device which operates in the merge management mode. The details of this process will be described later. Here, the operation during the DW period and a discovery beacon transmission process outside the DW period are performed according to the NAN standard in both operation modes.

At this point, according to the present embodiment, the NAN device 101 performs the NAN function start process in order of the processes in the flowchart illustrated in FIG. 4; however, the NAN cluster generation in S404 or the operation mode determination process in S406 may be executed before the passive scanning in S401. In this case, the NAN device 101 may execute the passive scanning in S401 for a certain period of time after the operation mode determination process.

Next, with reference to FIG. 5, a first example of the operation mode determination process flow that the NAN device 101 executes in S406 will be described. Here, the flowchart illustrated in FIG. 5 may be realized by the control unit 202 of the NAN device 101 executing a control program stored in the storage unit 201 and controlling calculating and processing of information and each hardware.

The NAN device 101 firstly determines which of the three roles—a master, a non-master sync, and a non-master non-sync—it is performing in the NAN cluster according to the NAN standard (S501). In the NAN standard, all the NAN devices at the timing of generating a NAN cluster and at the timing of joining a NAN cluster operate as a master. After that, the NAN device changes its role to a non-master sync or a non-master non-sync according to need, based on the sync beacon received during the DW period. The NAN device changes its role according to a received signal strength indicator (RSSI) value of the sync beacon, a master rank of the sync beacon, an AMR value, and a hop count field value, for example. Here, the AMR is an abbreviation of an anchor master rank. When the role of the NAN device does not change for equal to or more than two DW periods, the NAN device judges that its role has settled and the role determination process can be ended; however, this example does not set any limitation and this process may be continued for a predetermined period of time, for example. Here, the role may be changed when the sync beacon is received during the DW period, or at the timing when the DW period ends. Thus, every time when the role is changed, a process from S501 of FIG. 5 may be executed. With this configuration, the operation mode can be properly switched every time when the role is changed.

After that, the NAN device 101 determines whether or not the role is a non-master non-sync (S502). Then, when its role is not a non-master non-sync (NO in S502), the NAN device 101 determines to operate in a merge management mode (S503). Further, when its role is a non-master non-sync, the NAN device 101 determines to operate in a power saving mode (S504). In other words, when its role is to transmit a sync beacon, the NAN device 101 operates in the merge management mode and, in other cases, the NAN device 101 operates in the power saving mode.

As described above, since an RSSI value of the sync beacon is used as a factor in the role determination according to the NAN standard, the NAN device determines whether or not to change its role based on whether or not the RSSI value is equal to or greater than a predetermined threshold value. In other words, when the RSSI value is equal to or greater than the threshold value, the NAN device shifts from a master to a non-master sync, and further, shifts its role from a non-master sync to a non-master non-sync. Since the RSSI value is basically proportional to a distance between the transmitting and receiving devices, there is likely to be a NAN device of a master or a non-master sync near the NAN device of a non-master non-sync. Thus, even when operating in the power saving mode, the NAN device of a non-master non-sync can acquire information of another NAN cluster from a NAN device which operates as a master or a non-master sync.

Figure 5:
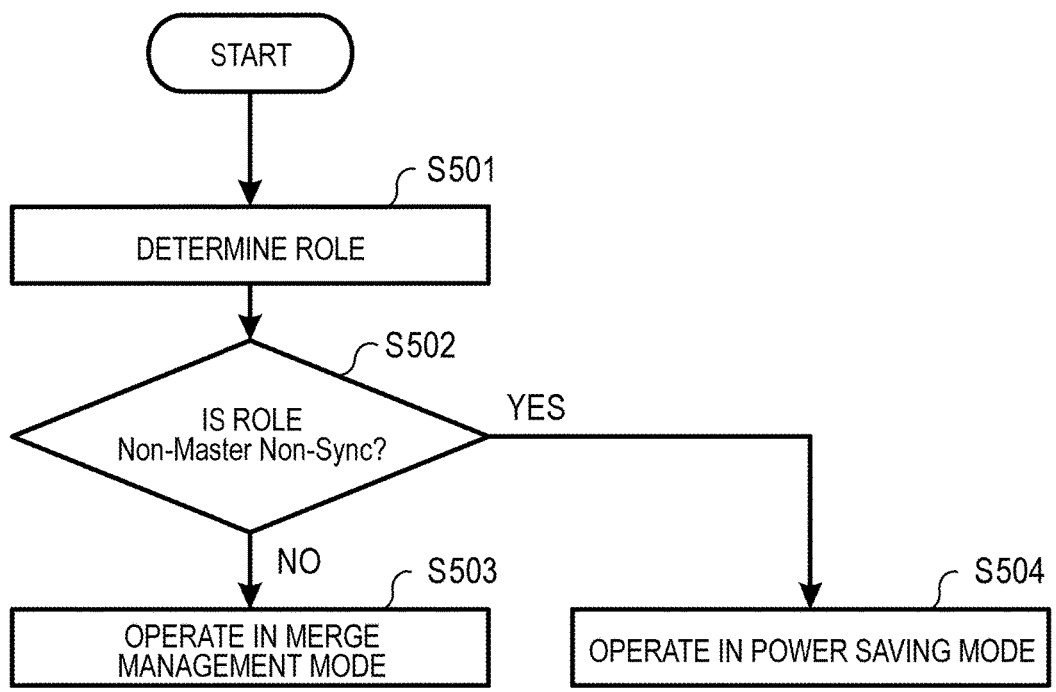
FIG. 5 is a flowchart illustrating a first example of an operation mode determination process flow according to one embodiment.

In FIG. 5, an example that the operation mode is switched according to whether or not the NAN device is a non-master non-sync has been explained; however, the operation mode may be switched based on whether or not the NAN device is a master. In other words, in a case of a master, the NAN device operates in the merge management mode and, in a case of a non-master sync or a non-master non-sync, the NAN device operates in the power saving mode. In this case, since the NAN device operates in the merge management mode only in a case of a master, the possibility of operating in the power saving mode becomes higher and the power saving performance can be further improved.

Next, with reference to FIG. 6, an example of a process flow executed in the wireless communication system will be described. In the following explanation, it is assumed that the master rank of the NAN device 101 is higher than the master rank of the NAN device 102 and the NAN device 103 continues to operate as a master of the NAN cluster 107. Here, in FIG. 6, the NAN devices 104 and 105 are omitted in purpose of simplification of the explanation. Further, it is assumed that the cluster grade of the NAN cluster 107 is higher than that of the NAN cluster 106. Further, in this process example, it is assumed that the NAN device 102 searches an image sharing service and the device that can provide the image sharing service is only the NAN device 103.

Figure 6:
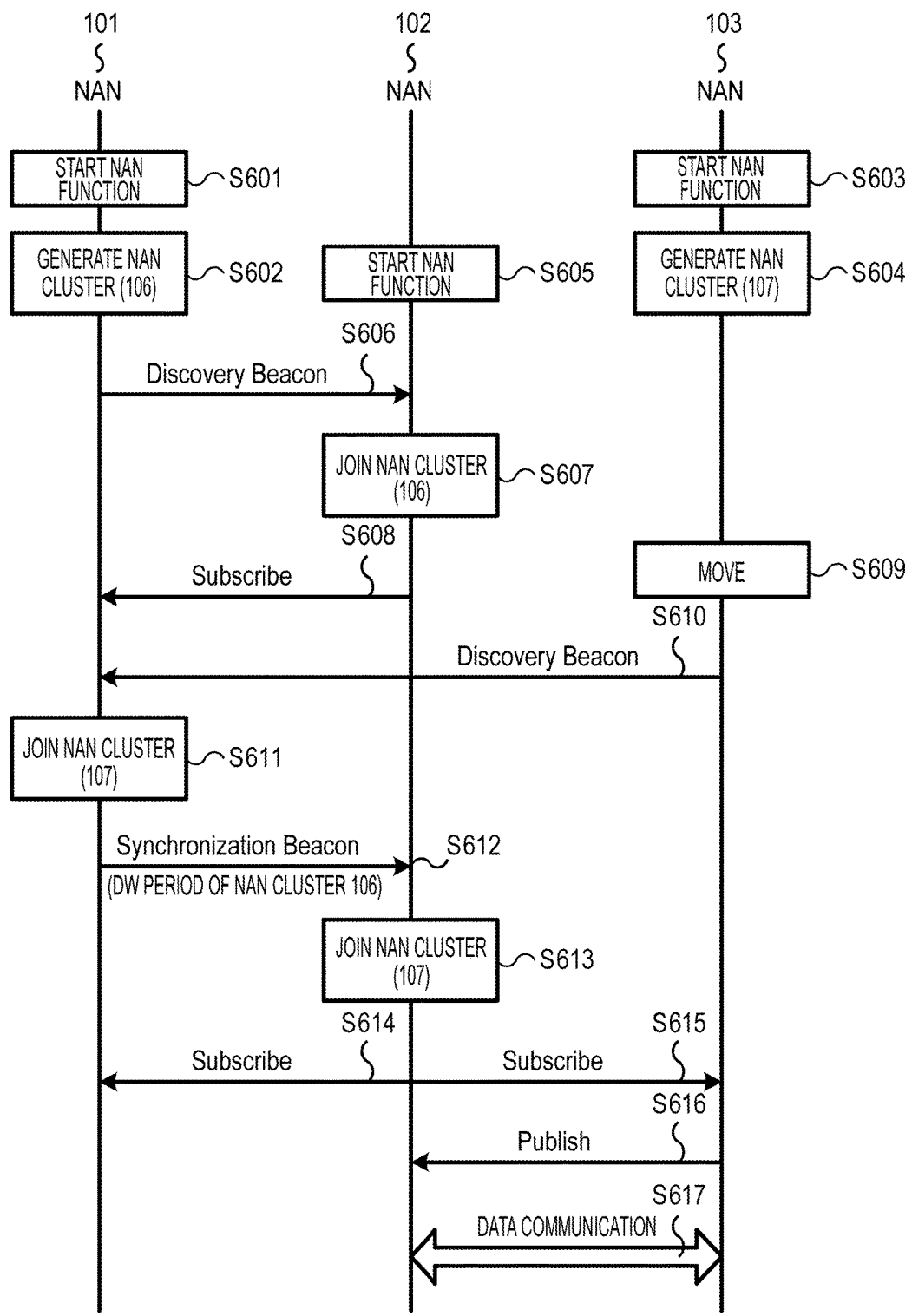
FIG. 6 is a sequence diagram illustrating an example of a process flow in a wireless communication system according to one embodiment.

In FIG. 6, firstly, the NAN functions of the NAN devices 101 and 103 are started by the users of the respective devices and it is assumed that the NAN devices 101 and 103 start the NAN functions (S601 and S603). Here, it is assumed that there is not another NAN device in searching areas of the NAN devices 101 and 103 respectively and, further, the NAN devices 101 and 103 are located in areas where radio waves do not reach each other. Then, the NAN devices 101 and 103 perform passive scanning as described with reference to FIG. 4; however, another NAN device cannot be found for a certain period of time. Thus, the NAN devices 101 and 103 generate the NAN clusters 106 and 107 respectively (S602 and S604).

Here, since there is not any NAN device in respective vicinity areas, the NAN devices 101 and 103 determine the roles of the NAN devices 101 and 103 as a master as described related to S501 of FIG. 5. Then, as described related to S503 of FIG. 5, the NAN devices 101 and 103 both operate in the merge management mode. In this case, since the NAN devices 101 and 103 are only the NAN device in the respective NAN clusters, the NAN devices 101 and 103 operate as an anchor master.

Then, after the NAN device 101 generates the NAN cluster 106, the NAN function of the NAN device 102 is activated by user's operation and it is assumed that the NAN function of the NAN device 102 is started (S605). Then, the NAN device 102 starts passive scanning. During this period, since the NAN device 101 periodically transmits a discovery beacon (S606), the NAN device 102 can find the NAN cluster 106 generated by the NAN device 101 during the passive scanning. Then, the NAN device 102 can join the NAN cluster 106 to which the NAN device 101 belong (S607). Here, at this timing, the NAN device 102 initially determines its role as a master, according to the NAN standard.

When the NAN device 102 joins the NAN cluster 106, the NAN device 102 performs a role determination as described in S501 to fix its role. In this example, as described above, the master rank of the NAN device 101 is higher than that of the NAN device 102. Further, the NAN device 102 is assumed to receive a radio wave from the NAN device 101 with a RSSI value larger than the threshold value, which is RSSI_close, defined in the NAN standard. In this case, when a sync beacon transmitted from the NAN device 101 during the DW period of the NAN cluster 106 is received, the NAN device 102 shifts its role from a master to a non-master sync. Here, an AMR value of the NAN device 102 is rewritten with an AMR value included in the received sync beacon, and a hop count value is set to a value in which one is added to a hop count value included in the sync beacon (which is "1"). Since the NAN device 101 is an anchor master, the AMR value included in the sync beacon transmitted from the NAN device 101 becomes a value of the master rank of the NAN device 101 and the hop count value becomes zero.

The NAN device 102 receives the sync beacon retransmitted from the NAN device 101 during a following DW period. In this case, the AMR value of the NAN device 102 and the AMR value of the received sync beacon correspond to each other, and the hop count value of the sync beacon is smaller than the hop count value of the NAN device 102. Thus, the NAN device 102 shifts its role from a non-master sync to a non-master non-sync according to the NAN standard. When the configuration of the NAN cluster 106 is not changed during and after a following DW period, the NAN device 102 receives the same sync beacon. Thus, the NAN device 102 keeps operating as a non-master non-sync without changing its role. As a result, the NAN device 102 determines to operate in the power saving mode.

Here, the NAN device 102 broadcasts a subscribe message in the DW period of the NAN cluster 106 to search an image sharing service (S608). The NAN device 101 can receive the subscribe message but does not transmit a publish message since the NAN device 101 cannot provide the image sharing service. On the other hand, the radio wave from the NAN device 102 does not reach the NAN device 103. Or the NAN device 103 cannot receive the subscribe message from the NAN device 102 since the NAN device 103 belongs to the NAN cluster 107, which is different from the NAN cluster 106 that the NAN device 102 belongs to, has a different DW period.

After that, it is assumed that the NAN device 103 moves (S609) and the NAN device 101 becomes able to receive a discovery beacon from the NAN device 103.

In this case, since the NAN device 101 is operating in a merge management mode, the NAN device 101 also keeps the receiving function of the communication unit 206 active outside the DW period to find another cluster. Here, the NAN device 101 may keep the transmitting function of the communication unit 206 inactive. In other words, the NAN device 101 activates both of the transmitting function and receiving function during the DW period of the NAN cluster to which the NAN device 101 belongs and, in the merge management mode, the transmitting function can be deactivated while the receiving function is activated during a predetermined period of time outside the DW period. Further, the NAN device 101 may deactivate both of the transmitting function and receiving function during a period which is not either of the DW period nor the above predetermined period. Further, the NAN device 101 sets the predetermined period to be equal to or longer than 200 TUs, which is a maximum transmission cycle of a discovery beacon defined in the NAN standard. With this configuration, the possibility that the NAN device 101 can receive a discovery beacon transmitted from a NAN cluster which is different from the NAN cluster 106 to which the NAN device 101 belongs can be increased. With this, the NAN device 101 receives the discovery beacon of the NAN device 103 (S610).

Here, as described above, since the NAN cluster 107 has a higher cluster grade than that of the NAN cluster 106, the NAN device 101 joins the NAN cluster 107 by a NAN cluster merge process defined in the NAN standard (S611). Then, the NAN device 101 transmits a sync beacon during the DW period of the NAN cluster 106 (S612). The sync beacon is applied with a NAN IE including a cluster ID of the NAN cluster 107 in an A3 address field. Here, according to the present embodiment, a sync beacon is used to give notice of information of the NAN cluster 107; however, other signals such as a probe response may be used. Further, the NAN device 101 notifies the NAN device 102 of information of the NAN cluster 107 after joining the NAN cluster 107; however, the NAN device 101 may notify the NAN device 102 of information of the NAN cluster 107 before joining the NAN cluster 107.

The NAN device 102 is operating in a power saving mode, and the receiving function of the communication unit 206 is deactivated outside the DW period. Thus, there may be a case that the NAN device 102 cannot receive a discovery beacon in S610. However, the NAN device 102 can receive the sync beacon of S612 since the sync beacon is transmitted during a period when the receiving function of the communication unit 206 is active. Therefore, the NAN device 102 can receive information of the NAN cluster 107 from the sync beacon and join the NAN cluster 107 (S613).

When the NAN device 102 joins the NAN cluster 107, the NAN device 102 broadcasts a subscribe message again during the DW period of the NAN cluster 107 to search an image sharing service (S614 and S615). In this case, the NAN device 103 is able to provide an image sharing service. Thus, the NAN device 103 transmits a publish message in response to the subscribe message (S616) and notifies the NAN device 102 that the NAN device 103 can provide the image sharing service.

After that, the NAN devices 102 and 103 transmit and receive image data by data communication (S617). Here, the data communication in S617 may be performed by a NAN connection or may be performed by establishing another connection of another communication standard such as Wi-Fi Direct®.

In this manner, according to the present embodiment, a NAN device operating in a role other than a non-master non-sync monitors a presence of another cluster and notifies a NAN device operating in a role of a non-master non-sync of the result. Thus, since the NAN device operating in a role of a non-master non-sync deactivates the receiving function and transmitting function of the communication unit 206 outside the DW period, the NAN clusters can be merged while saving power consumption of the entire system. Particularly, under a condition that a large number of NAN devices exist in a certain range, since more NAN devices operate as a non-master non-sync, the power saving performance of the entire system can be significantly improved.

Second Embodiment

According to the present embodiment, a NAN device operating in a merge management mode explicitly notifies another NAN device belonging to the same NAN cluster that the NAN device is operating in a merge management mode. According to the first embodiment, it may be considered that the NAN device operating in a power saving mode operates assuming that a notification of information of another NAN cluster can be received from a NAN device in a surrounding area. On the other hand, according to the present embodiment, a NAN device operating in a power saving mode can explicitly know that information is to be notified when another NAN cluster is found, by receiving a notification, from a NAN device in a surrounding area, that the NAN device is operating in a merge management mode. Further, when there is a NAN device operating in a merge management mode in a surrounding area, the NAN device stops its operation in the merge management mode and switches to a power saving mode so that the power saving performance of the entire system can be improved. In the following discussion, only one feature different from the first embodiment will be described.

According to the present embodiment, the NAN device operating in the merge management mode notifies another NAN device in the NAN cluster to which the NAN device belongs that the NAN device operates in the merge management mode by using a sync beacon. In this embodiment, in addition to this, the NAN device operating in the merge management mode may perform the above notification by publishing a merge management service by using SDF of the NAN standard. Further, the NAN device may perform the above notification according to a communication standard other than NAN. Further, the NAN device may perform the above notification by negotiation with devices of another method in advance.

Figure 7:
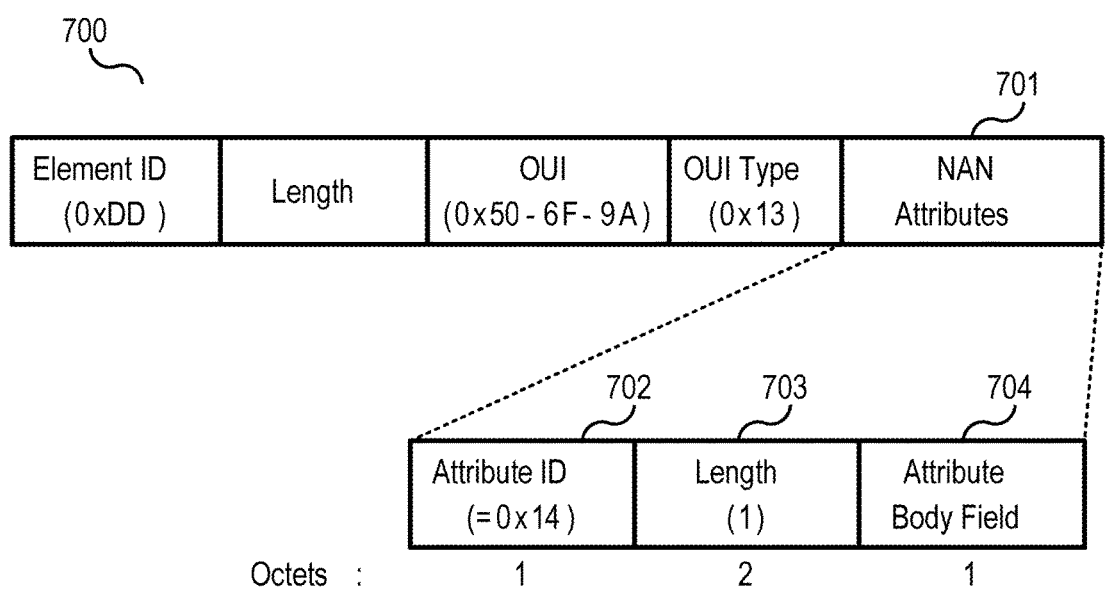
FIG. 7 is a diagram illustrating a configuration example of a NAN IE according to one embodiment.

The sync beacon includes NAN IE 700 as illustrated in FIG. 7, and, to NAN IE 700, one or more NAN attribute 701 can be applied. The NAN attribute 701 includes an attribute ID 702, which is an identifier, an attribute body field 704, which is a property content, and a length 703 that indicates its length. As a value to be stored in the attribute ID, there is a value defined in the standard, a vendor specific attribute that is unique in each vendor and extensible, and a reserved, which has not been used at this point. According to the present embodiment, an attribute ID "14" as a reserved is used as an attribute to give notice of an operation in a merge management mode. However, it is not limited to this example and other values may be used. Further, for example, when the attribute ID is "14," the length is set as "1," and it is assumed that "0" of the attribute body field 704 represents an operation in a merge management mode and "1" represents an operation in power saving mode. Each NAN device can recognize operation modes of NAN device in the surrounding area with reference to the attribute body field 704 of a received sync beacon. Here, a value of a data field may be set to any value and it is not limited to the above content.

The NAN device in the first embodiment switches the operation mode according to its role, and the NAN device in the present embodiment switches its operation mode according to an operation mode of a NAN device in a surrounding area. Here, according to the present embodiment, as an example, the NAN device is assumed to operate in a merge management mode at a timing of generating a NAN cluster or a timing of joining a NAN cluster. Then, the NAN device receives a sync beacon having a NAN IE of the above described attribute ID of "14," and changes its operation mode to the power saving mode when it is detected that another NAN device in the surrounding area is operating in a merge management mode. On the other hand, the NAN device changes its operation mode to the merge management mode when all NAN devices in a surrounding area operate in a power saving mode and the NAN device itself is operating in a power saving mode. With this configuration, since the NAN device operates in a power saving mode when there is another NAN device operating in a merge management mode in a surrounding area, the power consumption of the entire system can be reduced.

Next, an operation mode determination process according to the present embodiment will be described with reference to FIG. 8. Here, a process executed by the NAN device 101 will be explained; however, the NAN devices 102 to 105 can execute the similar process. Further, the flowchart illustrated in FIG. 8 can be realized by the control unit 202 of the NAN device 101 executing a control program stored in the storage unit 201 and executing a control calculating and processing of information and each hardware.

In this process, the NAN device 101 firstly performs mode monitoring of another NAN device (S801). The mode monitoring of another NAN device is performed by receiving a sync beacon transmitted from another NAN device and monitoring the attribute body field 704 of NAN IE 700 included in the sync beacon. When the attribute body field 704 of the received sync beacon is "0," the NAN device 101 can recognize that there is a NAN device which is operating in a merge management mode.

When it is not determined that there is a NAN device operating in a merge management mode by the mode monitoring of other NAN devices (No in S802), the NAN device 101 continues the mode monitoring of other NAN devices for a certain period of time (NO in S803). The certain period of time here is 200 TUs for example; however, this example does not set any limitation.

When it is determined that there is another NAN device operating in a merge management mode within the certain period of time (YES in S802), the NAN device 101 decides to operate in a power saving mode (S805). On the other hand, when it cannot be determined that there is another NAN device in a merge management mode after the certain period of time (YES in S803), the NAN device 101 decides to operate in a merge management mode (S804).

Figure 8:
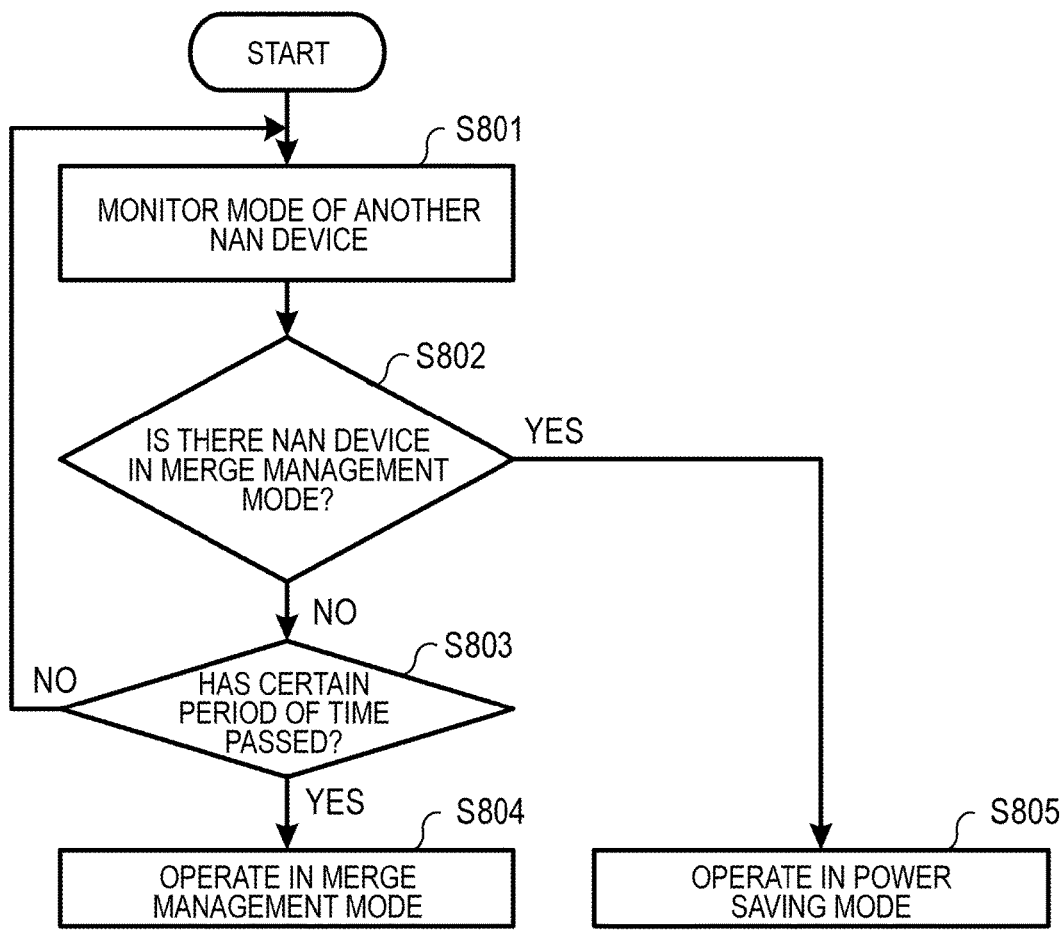
FIG. 8 is a flowchart illustrating a second example of a flow of the operation mode determination process according to one embodiment.

The NAN device 101 can execute the process in FIG. 8 every time when a sync beacon of an attribute ID of "14" is received from another NAN device, but is not limited to this. For example, after executing the process of FIG. 8 once, the NAN device 101 may not execute the process of FIG. 8 for a certain period of time to reduce process load.

Here, when a notification that an operation in a merge management mode is received from another device in a surrounding area, the NAN device 101 does not have to switch to the power saving mode immediately. For example, the NAN device 101 compares a master rank of the NAN device, which is a sender of the notification with the master rank of the NAN device 101 and, when the master rank of the NAN device 101 is lower, it is decided to operate in a power saving mode. This configuration can prevent both of the two NAN devices from switching to a power saving mode, in a case that the two NAN devices notify each other that they are operating in a merge management mode. Further, in a case that the master ranks of the two NAN devices are the same, the operation modes of these NAN devices may be kept as the merge management mode. Further, in a case that all NAN devices in a surrounding area are in a power saving mode, the NAN device 101 may compare master ranks of those NAN devices in the surrounding area with the master rank of the NAN device 101. Then, the NAN device 101 may shift to a merge management mode only when its master rank is higher than any of the NAN devices in the surrounding area. This configuration can prevent the power consumption of the entire system from increasing as the plurality of NAN devices switch to a merge management mode when all the NAN devices in the surrounding area are in a power saving mode. Here, in a case that there are a plurality of NAN devices having highest master rank, two or more NAN devices among the plurality of NAN devices may shift to a merge management mode.

According to the present embodiment, by adding a function to set attribute ID of "14" of NAN IE to the NAN standard and give notice of an operation mode, the NAN devices are allowed to notify each other of their operation modes (a merge management mode or a power saving mode). With this configuration, a NAN device operating in a power saving mode can explicitly recognize that there is a NAN device operating in a merge management mode in a surrounding area and, when there is a NAN cluster to merge, can surely join the NAN cluster. Further, when there is no other NAN device operating in a merge management mode in a surrounding area, the NAN device can promptly recognize a NAN cluster and join the NAN cluster by operating in the merge management mode.

Here, the first and second embodiments may be combined. In other words, the NAN device may decide its operation mode according to both of its roll and an operation mode of another NAN device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

What is claimed is:

1. A communication apparatus comprising:
a communication unit having a transmitting function and a receiving function for a radio signal compliant with the neighbor awareness network (NAN) standard, wherein, while belonging to a first NAN cluster, the communication apparatus activates the transmitting function and the receiving function to perform communication during a first period that is a discovery window (DW) of the first NAN cluster, and deactivates the transmitting function and the receiving function outside of the discovery window;
a determination unit configured to determine whether or not the communication apparatus, among devices in the first NAN cluster, performs monitoring for a presence of a second NAN cluster which is different from the first NAN cluster during a second period which is outside of the first period;
a control unit configured to control the communication unit by activating the receiving function and performing the monitoring during the second period when it is determined that the communication apparatus performs the monitoring, and by keeping the transmitting function and the receiving function inactive outside the first period when it is determined that the communication apparatus does not perform the monitoring.

2. The communication apparatus according to claim 1, wherein the determination unit determines that the communication apparatus performs the monitoring when the communication apparatus is operating in a role of transmitting a beacon, and determines that the communication apparatus does not perform the monitoring when the communication apparatus is operating in a role of not transmitting a beacon.

3. The communication apparatus according to claim 2, wherein the determination unit determines whether or not the communication apparatus performs the monitoring each time the role of the communication apparatus changes.

4. The communication apparatus according to claim 1, wherein the determination unit determines that the communication apparatus performs the monitoring when the communication apparatus is operating in a role of transmitting a signal to be found by another device in the first NAN cluster, and determines that the communication apparatus does not perform the monitoring when the communication apparatus is operating in a role of not transmitting the signal.

5. The communication apparatus according to claim 1, wherein the second period has a length equal to or greater than a cycle that a signal for assisting another device to find the second NAN cluster is transmitted in a case where there is the second NAN cluster.

6. The communication apparatus according to claim 1, wherein the monitoring for a presence of the second NAN cluster is performed by receiving a discovery beacon, which is transmitted from a device in the second NAN cluster, according to the NAN standard.

7. The communication apparatus according to claim 1, wherein the determination unit further determines whether another device is to perform the monitoring or the communication apparatus is to perform the monitoring when it is notified, from the another device in the first NAN cluster, that the another device is performing the monitoring and the communication apparatus is also performing the monitoring.

8. The communication apparatus according to claim 7, wherein the further determination is made based on values of master ranks of the another device and the communication apparatus according to the NAN standard.

9. The communication apparatus according to claim 1, wherein the determination unit further determines whether another device is to perform the monitoring or the communication apparatus is to perform the monitoring when it is not notified, from the another device in the first NAN cluster, that the another device is performing the monitoring and the communication apparatus is not performing the monitoring.

10. The communication apparatus according to claim 1, wherein the determination unit determines that the communication apparatus is not to perform the monitoring when it is notified, from another device in the first NAN cluster, that the another device is performing the monitoring, and determines that the communication apparatus is to perform the monitoring when it is not notified, from the another device in the first NAN cluster, that the another device is performing the monitoring.

11. The communication apparatus according to claim 1, wherein the communication unit determines that there is a second NAN cluster when, during the second period, a signal to assist other devices to find the second NAN cluster or a signal transmitted during a third period during which a device in the second NAN cluster is able to communicate, is received.

12. A method for a communication apparatus, comprising:
performing a transmitting function and a receiving function for a radio signal compliant with the neighbor awareness network (NAN) standard, wherein, while belonging to a first NAN cluster, the communication apparatus activates the transmitting function and the receiving function to perform communication during a first period that is a discovery window (DW) of the first NAN cluster, and deactivates the transmitting function and the receiving function outside of the discovery window;
determining whether or not the communication apparatus, among devices in the first NAN cluster, performs monitoring for a presence of a second NAN cluster which is different from the first NAN cluster during a second period which is outside of the first period;
controlling the performing of the transmitting function and the receiving function by activating the receiving function and performing the monitoring during the second period when it is determined that the communication apparatus performs the monitoring, and by keeping the transmitting function and the receiving function inactive outside the first period when it is determined that the communication apparatus does not perform the monitoring.

13. A non-transitory computer-readable storage medium storing instructions that when executed cause a computer to perform a process, the process comprising:
performing a transmitting function and a receiving function for a radio signal compliant with the neighbor awareness network (NAN) standard, wherein, while belonging to a first NAN cluster, the communication apparatus activates the transmitting function and the receiving function to perform communication during a first period that is a discovery window (DW) of the first NAN cluster, and deactivates the transmitting function and the receiving function outside of the discovery window;
determining whether or not the communication apparatus, among devices in the first NAN cluster, performs monitoring for a presence of a second NAN cluster which is different from the first NAN cluster during a second period which is outside of the first period;
controlling the performing of the transmitting function and the receiving function by activating the receiving function and performing the monitoring during the second period when it is determined that the communication apparatus performs the monitoring, and by keeping the transmitting function and the receiving function inactive outside the first period when it is determined that the communication apparatus does not perform the monitoring.

* * * * *